United States Patent [19]

Foster

[11] Patent Number: 4,552,379

[45] Date of Patent: Nov. 12, 1985

[54] COMPRESSION LINK ADAPTOR ASSEMBLY

[76] Inventor: Kenneth D. Foster, 7615 Shelby La., Broken Arrow, Okla. 74014

[21] Appl. No.: 554,985

[22] Filed: Nov. 25, 1983

[51] Int. Cl.$^4$ ............................................. B62D 17/00
[52] U.S. Cl. .................................... 280/661; 267/21 R
[58] Field of Search ............... 280/661, 690, 788, 660; 267/21

[56] References Cited

U.S. PATENT DOCUMENTS

| | | | |
|---|---|---|---|
| 3,024,040 | 3/1962 | Muller | 280/660 |
| 3,819,202 | 6/1974 | Castoe | 280/661 |
| 4,252,338 | 2/1981 | Ingalls et al. | 280/661 |
| 4,453,733 | 6/1984 | Sautter et al. | 280/661 |

Primary Examiner—Richard A. Bertsch

[57] ABSTRACT

The present invention provides an improved compression link assembly for vehicular suspension systems which utilize a compression link rod to effect caster angle determination and which are fixed in a preset relation to the vehicular frame during factory assembly of the vehicle. An adaptor assembly is provided for mounting to the factory delivered compression link rod, the compression link rod having a shoulder stop formed between first and second end portions thereof. The adaptor assembly comprises an adaptor sleeve having a longitudinal bore with an internally disposed shoulder stop engaging portion which abuts against the shoulder stop of the compression link as the second end portion thereof is extended through the adaptor sleeve. At least one compression spacer member is supported by the adaptor sleeve, and a lock nut and a backup nut cooperate to grippingly secure the compression link rod to the main frame of the vehicle.

13 Claims, 7 Drawing Figures

COMPRESSION LINK ADAPTOR ASSEMBLY

BACKGROUND OF THE INVENTION

1. Field of the Invention

The present invention relates to the field of automobile suspension systems and more particularly, but not by way of limitation, to an improved compression link adaptor assembly usable with existing factory equipped compression link rods to provide adjustable caster setting to a suspended automobile wheel assembly.

2. Discussion of Prior Art

U.S. Pat. No. 3,024,040, issued to Muller, teaches a front wheel suspension assembly for motor vehicles in which the main frame of the vehicle is elastically supported on an auxillary cross frame carrying thereon the wheel suspension and the wheel spring system. The Mueller suspension system involves the use of support members elastically attached between the wheel assembly and the main frame. FIG. 4 of Muller shows explicitly the elastic attachment of the support members to the main frame, with double pairs of lock nuts serving to determine the effective length of the support members.

U.S. Pat. No. 3,819,202, issued to Castoe, teaches adaptor assemblies which provide adjustability to the camber and caster angles of a vehicular suspension system which is designed originally to be unadjustable (that is, where the camber and caster angles are fixed during factory assembly of the vehicle). A transverse link adjustably determines the effective length between the cross member and the hub assembly to establish the camber setting of the wheel hub assembly. Also, a compression link extends between the hub assembly and a frame cross member, the effective length of the compression link being adjustable via a pair of nuts threadingly supported on a modified compression link to vary the caster angle setting. To utilize the Castoe adaptor assembly, the factory installed compression link must be modified or replaced with one conforming to that shown in the Castoe patent.

SUMMARY OF THE INVENTION

The present invention provides an improved compression link assembly which is capable of converting a factory assembled, fixed camber setting compression link rod to an adjustable one in which the effective length of the compression link rod can be selectively determined for varying the caster setting of a vehicular wheel assembly. In particular, the present invention comprises an adaptor assembly for use with a compression link rod having a first end portion attachable to the wheel assembly and a second portion of reduced cross-sectional dimension, the compression link rod having a shoulder stop formed between the first end portion and the second end portion. The adaptor assembly is characterized as interconnecting the second end portion of the compression link rod to the main frame and adjustably establishing the effective length of the compression link rod, wherein the adaptor assembly comprises an adaptor sleeve having a longitudinal bore with an internal shoulder stop engaging portion, the second end portion of the compression link rod extendable through the longitudinal bore such that the shoulder stop abuttingly engages the shoulder stop engaging portion, and the extremity of the second end portion of the compression link rod protruding from the longitudinal bore and extendable through a selected aperture in the main frame; at least one compression spacer member is supported on the adaptor sleeve; and lock means used for securing the compression link rod to the main frame such that the compression spacer member and the main frame is grippingly engaged such that compressive stress is transferred between the wheel assembly and the main frame via the interaction between the shoulder stop of the compression link rod and the adaptor sleeve as elastically secured to the main frame.

Accordingly, an object of the present invention is to provide an improved compression link assembly in which the effective length of the compression link rod of a vehicular suspension system is adjustable for varying the caster setting of the wheel assembly.

Another object of the present invention, while achieving the above stated object, is to provide an adaptor assembly whereby the factory installed compression link rod of a vehicular suspension system can be adapted to be made adjustable for varying the caster setting of the wheel assembly.

Another object of the present invention, while achieving the above stated objects, is to provide an inexpensive and effective adaptation to an existing, factory installed compression link rod which is relatively easy to install and maintain.

Other objects, advantages and features of the present invention will become clear from the following detailed description of the preferred embodiment when read in conjunction with the drawings and appended claims.

DESCRIPTION

Figure 1:
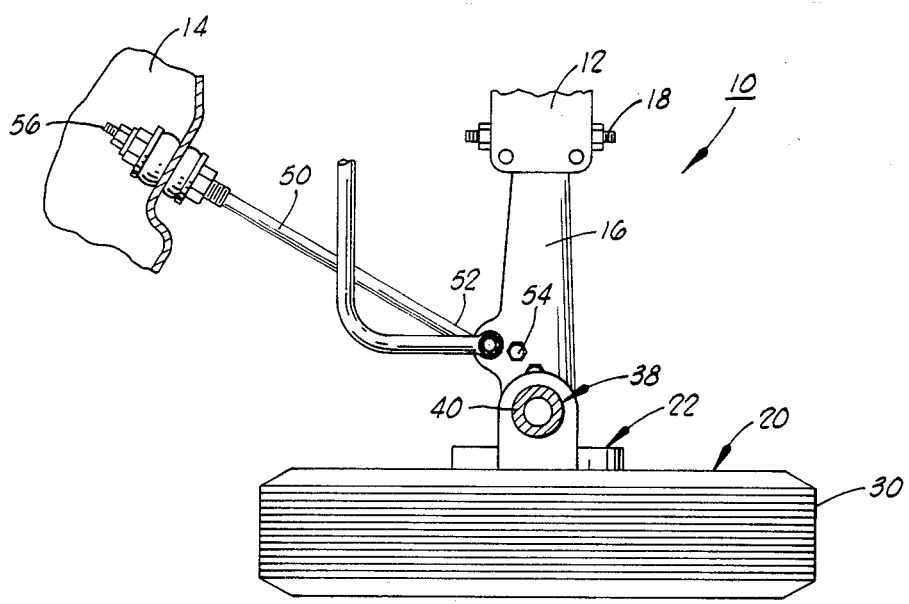
FIG. 1 is a plan view of a typical vehicular wheel assembly, with portions of the vehicle not shown, and which shows the improved compression link assembly of the present invention.
Figure 2:
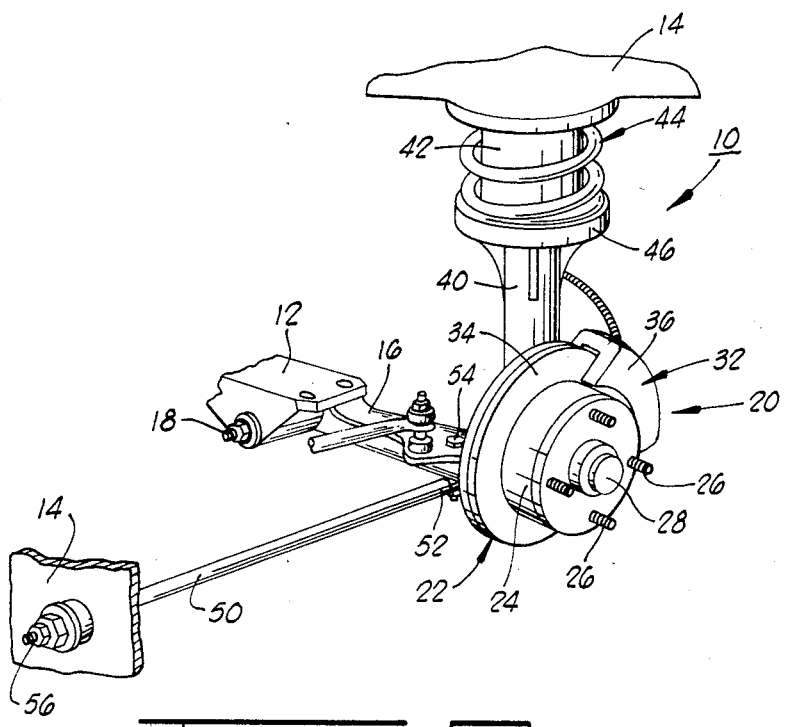
FIG. 2 is an isometric view of the wheel assembly of FIG. 1 with certain parts deleted and others included to illustrate the improved compression link assembly of the present invention.

Refering to the drawings generally, and particularly to FIGS. 1 and 2, shown therein is a portion of a front end suspension for an automobile and designated by the numeral 10. All of the components of the suspension system 10 are not shown in order to simplify the drawings and to more graphically illustrate the present invention. It will be sufficient for the present disclosure to identify to the person of ordinary skill the components of known suspension systems for the purpose of framing the environment in which the present invention resides.

The suspension system 10 is of the type that has a suspension cross member 12 (one end of which is shown) that extends laterally to a main frame 14 (only portions of which are depicted). The main frame 14 is attached to the suspension cross member 12 at points not shown in the drawings. A transverse link member 16 is pivotally connected to the suspension cross member 12 via a conventional bolting connector 18.

The transverse link member 16 is fixed directly to a wheel assembly 20 which includes a hub assembly 22. The hub assembly 22 has a hub 24 which carries a plurality of wheel stud bolts 26 extensive therefrom, and the hub 24 is rotatingly mounted a stub axle 28. A wheel 30 having an apertured rim (not shown) is secured to the hub 24 via the stud bolts 26. A conventional disc brake assembly 32 is provided and includes the rotor 34 on the hub 24 and a hydraulically operated caliper mechanism 36. The wheel 30 has been removed in FIG. 2 in order to fully show these features of the wheel assembly 20.

In addition to the loading transferred between the wheel assembly 20 and the suspension cross member 12 and transverse link member 16, vertical loading is transferred from the main frame 14 via a strut assembly 38 which also is attached to the hub assembly 22 and which includes a vertically extending post member 40 telescopically received within a tubular member 42, the upper portion of which is flexibly attached to the frame 14. It will be understood that the vertically extending post member 40 and the telescoping member 42 are components of a conventional hydraulic shock absorber system. A coil spring 44 is disposed between a spring seat 46, on the exterior surface of the post member 40, and the frame 14 as shown to cooperate with the shock absorber to cushion and dampen the vertical load transferred between the frame 14 and the wheel assembly 20.

Of course, the hub assembly 22 is mounted for steering about a vertically extending post, which is part of the strut assembly 38, and which can be integral with the vertically extending strut 40, or at least fixed relative thereto. Further, a compression link rod 50, provided to give lateral stability to the wheel assembly 20, is attached at a front end portion 52 thereof via bolts 54 to the transverse link 16 (and thus to the hub assembly 22). A second end portion 56 of the compression link rod 50 is elastically connected to the frame 14 in a manner to be made clear below. The effective length of the compression link rod 50 (that is, the length of the compression link rod 50 between the frame 14 and its connecting point to the transverse link 16), together with the length of the transverse link member 16 cooperatively determine the disposition of the wheel assembly 20 relative to the frame 14.

While the suspension system 10 has been discussed hereinabove with relation to a single wheel assembly 20, it will be understood that the other side of the wheel assembly 10 is constructed in mirror image thereto. That is, another wheel assembly is mounted on a transverse link like that described for the transverse link 16 but pivotally mounted to the other end (not shown) of the suspension cross member 12. Together, the two wheel assemblies support the suspension cross member 12 which in turn supports part of the load of the main frame 14, and vertical loading is transferred to the two wheel assemblies in the manner discussed hereinabove for the wheel assembly 20.

With the exception of the compression link rod 50, the above discussion has provided the environment to the present invention. The elastic connection of the compression link rod 50 to the frame 14 is the point at which the present discussion turns to the invention taught and claimed herein. As a vehicle leaves the factory assembly plant, the effective length of the compression link rod 50 is fixed, and no adjustment of such is provided for by the manufacturer. This means that the camber and caster angles of the wheel assembly 20 is preset, which in practice presents the problems encountered to reestablish proper camber and caster angles following distortion thereto by circumstances such as collision, wear and generally, any external environmental factors that would change the preestablished relationship of the wheel assembly 20.

Figure 3:
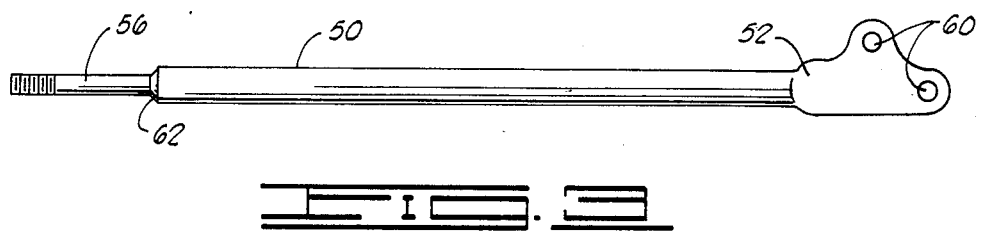
FIG. 3 is a plan view of a typical, factory installed compression link rod.

Turning now to the remaining drawings, the adjusting feature of the compression link rod 50 will be described. Shown in FIG. 3 is a top plan view of the compression link rod 50, which has a generally circular cross sectional shape except at its first end portion 52 where it is flattened and provided a pair of apertures 60 for its attachment via bolts 54 to the transverse link member 16 as described above. The second end portion 56 has a reduced cross sectional dimension so as to form a shoulder stop 62 between the medial portion of the compression link rod 50 and its second end portion 56. A portion of the second end portion 56 is externally threaded.

As shown in FIG. 3 and thus described, the compression link rod 50 is an unaltered, factory supplied part. Its attachment to the frame 14 is usually achieved via conventional mounting nuts, and in some cases, by elastomeric mounting means, to fix the effective length of the compression link rod 50.

Figure 4:
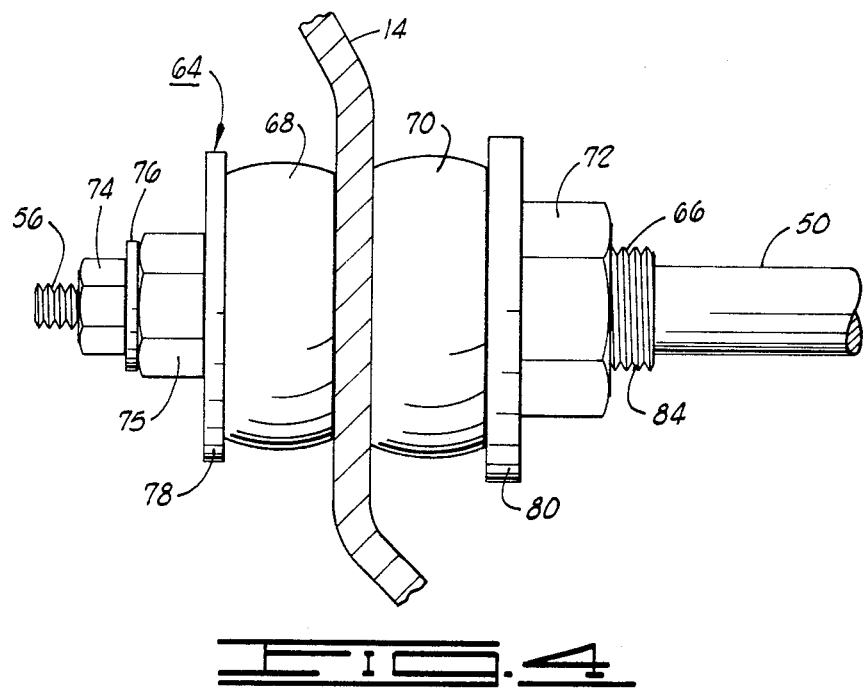
FIG. 4 is a view of the adaptor assembly of the present invention, showing the elastic attachment of the compression rod link of FIG. 3 to the main frame of a vehicle.

FIG. 4 is a side view of the adaptor assembly 64 of the present invention. In the preferred embodiment, as shown, the adaptor assembly 64 includes: an adaptor sleeve 66; a pair of elastomeric compression bushings or spacer members 68 and 70 (which may be provided with metal liner bushings if desired); a backup nut 72; lock nuts 74 and 75; and washer members 76, 78 and 80. In its assembled position, the adaptor assembly 64 is mounted over the second end portion 56 of a conventional compression link rod 50 and secured to a portion of the frame 14 in the manner described below.

Figure 5:
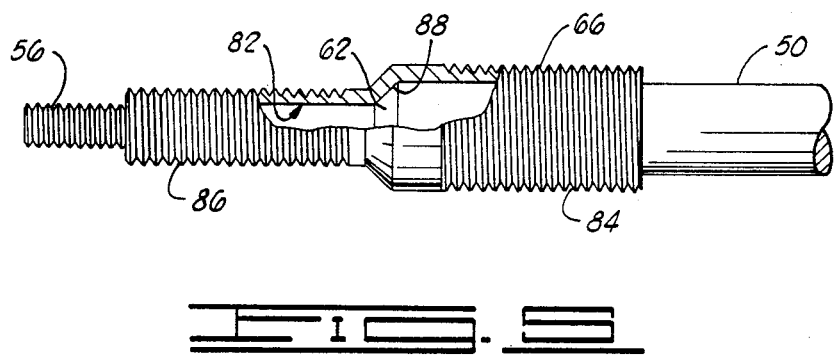
FIG. 5 shows a partial cutaway, adaptor sleeve of the present invention as slidably mounted on the distal end of the compression link rod of FIG. 3.

Shown in FIG. 5 is the adaptor sleeve 66 in partial cutaway view. As depicted, the adaptor sleeve 66 is an elongated, tubular sleeve member having a longitudinal bore 82 extending therethrough. The adaptor sleeve 66 has a first end portion 84 which has an internal bore sized to receive the medial portion of the compression link rod 50, and has a second end portion 86 that has an internal bore sized to receive the second end portion 56. Formed at the junction of the first end portion 84 and the second end portion 86 is a shoulder stop engaging portion 88. When mounted onto the compression link rod 50, the shoulder stop 62 abuttingly engages the shoulder stop engaging portion 88, and the length of the adaptor sleeve 66 is established such that a portion of the threaded extremity of the second end portion 56 protrudes from the longitudinal bore 82 as shown.

The adaptor sleeve 66 is threaded along its end 84 to threadingly receive the backup nut 72, and it is threaded along its second end portion 86 to threadingly receive the lock nut 75. The washer 78 has a bore that is fittingly receivable over the second end portion 86, and the washer 80 has a bore fittingly receivable over the first end portion 84. Also, the compression spacer 68 has a bore receivable over the second end portion 86, and the compression spacer 70 has a bore receivable over the first end portion 84.

Figure 6:
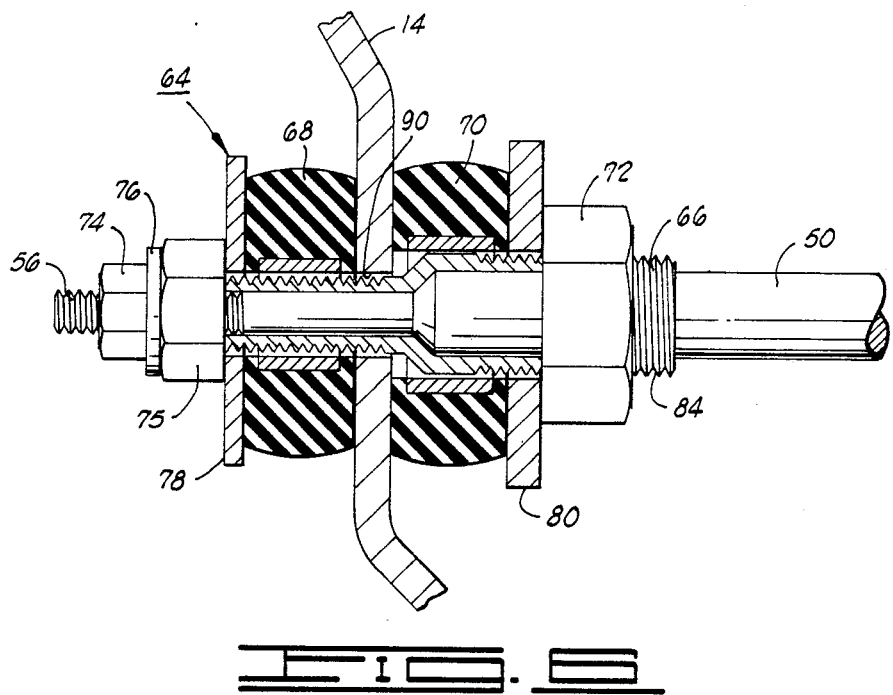
FIG. 6 is a view similar to FIG. 4 with certain parts cutaway to show the relationship of the various components thereof.

FIG. 6 shows the adaptor assembly 64 in partial cutaway cross sectional view. Here the arrangement of the various component parts of the adaptor assembly 64 are illustrated with reference to the compression link rod 50 to which they are mounted. In practice, the adaptor sleeve 66 is placed over the factory delivered, unmodified compression link rod 50, and the backup nut 72 is screwed onto the first end portion 84 of the adaptor sleeve 66. Next, the washer member 80 is placed over the adaptor sleeve 66, and the compression spacer 70 is likewise mounted. The second end portion 56 of the compression link rod 50, with the adaptor sleeve 66 mounted thereon, is extended through an aperture 90 in the frame 14. Then the compression spacer 68 is placed over the second end portion 86 of the adaptor sleeve 66, followed by the washer member 78 and the lock nut 75. Before tightening same, the first end portion 52 of the compression link rod 50 is bolted to the transverse link member 16 via bolts 54 through the apertures 60. Once secured thusly, the effective length of the compression link rod 50 can be established by varying the position of the backup nut 72 and then tightening the lock nut 75 as required. Once satisfied that the effective length is correct, the washer 76 and lock nut 74 can be placed onto the threaded extremity of the second end portion 56 and secured firmly against the lock nut 75.

Figure 7:
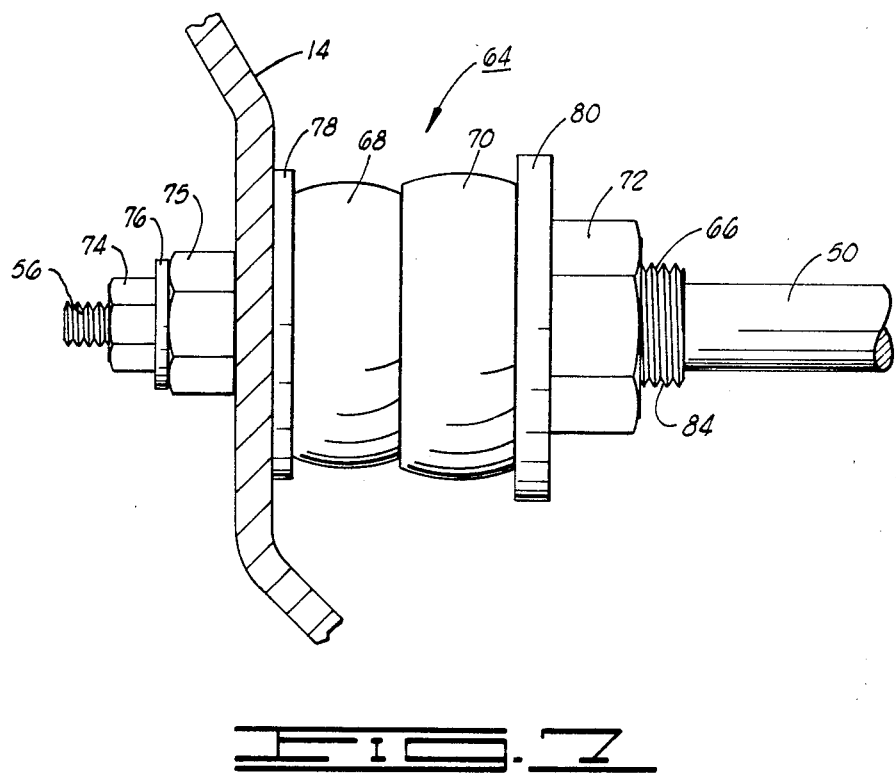
FIG. 7 is a view of the adaptor assembly of the present invention and is similar to the view shown in FIG. 3 with the exception that this figure shows a difference arrangement of the component parts relative to the main frame.

An alternative arrangement of the component parts of the adaptor assembly 64 in gripping engagement with the frame 14 is depicted in FIG. 7 wherein the frame 14 is placed between the lock nut 75 and the washer 78. The assembly of the adaptor assembly 64 will be readily apparent from the above discussion and need not be detailed further. Of course, the adaptor assembly 64 can be assembled with the frame 14 positioned between the washer 80 and the backup nut 72 (and any number of washer members can be provided as necessary).

In its assembled position, the adaptor assembly 64 elastically connects an existing compression link rod 50 to the vehicle frame 14 so as to transfer stress between the compression link rod 50 and the frame 14 via the lock nuts described and the shoulder stop 62 and the shoulder stop engaging portion 88 abuttingly interacting as shown and described. Once mounted, the effective length of the compression link rod 50, as required by circumstance, is a readily accomplishable task. One need only to loosen the lock nuts, move the backup nut 72 as necessary, and retighten the lock nuts.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are accomplished within the spirit of the invention disclosed and as defined in the appended claims.

What is claimed is:

1. An improved adjustable compression link assembly for effecting camber and caster settings of a wheel assembly wherein the wheel assembly is connected by a transverse link assembly to a laterally extending cross frame member of a main frame, the adjustable compression link assembly comprising, in combination:
   a compression link rod having a first end portion attachable to the transverse link assembly, a medial portion, and a threaded second end portion having a reduced cross-sectional dimension, the compression link rod further characterized as having a shoulder stop formed between the threaded second end portion and the medial portion thereof;
   adaptor sleeve means for interconnecting the threaded second end portion of the compression link rod to the main frame and adjustably establishing the effective length of the compression link rod, the adaptor sleeve means comprising:
      an adaptor sleeve having a longitudinal bore extensive therethrough and with an internal shoulder stop engaging portion, the threaded second end portion of the compression link rod extendable through the longitudinal bore such that the shoulder stop of the compression link rod abuttingly engages the shoulder stop engaging portion of the adaptor sleeve and the extremity of the threaded second end portion of the compression link rod protrudes from the longitudinal bore so as to be extendable through a selected aperture in the main frame;
      at least one compression spacer member supportable on the adaptor sleeve; and
      lock means for securing the compression link rod to the main frame such that the compression spacer member and the main frame are grippingly engaged between portions of the lock means.

2. The improved compression link assembly of claim 1 wherein the adaptor sleeve is externally threaded at a first threaded end portion and the lock means comprises:
   a backup nut threadingly supported by the first threaded end portion of the adaptor sleeve.

3. The improved compression link assembly of claim 2 wherein the adaptor sleeve has an externally threaded second end portion, and wherein the lock means further comprises:
   a pair of lock nuts, one of the lock nuts threadingly supported by the extremity of the threaded second end portion of the adaptor sleeve and the other lock nut threadingly supported by the threaded second end portion of the compression link rod such that when the compression link rod is secured to the main frame the lock nut supported by the second end portion of the adaptor sleeve and the backup nut are secured so as to transfer compressive stress between the main frame and the shoulder stop of the compression link rod.

4. The improved compression link assembly of claim 3 further comprising a second compression spacer member supportable on the adaptor sleeve, and wherein the first and second compression spacer members are compressingly secured between the main frame and the backup nut.

5. The improved compression link assembly of claim 3 further comprising a second compression spacer member supportable on the adaptor sleeve, and wherein one of the first and second compression spacer members is compressingly secured on each side of the main frame.

6. The improved compression link assembly of claim 3 further comprising a second compression spacer member supportable on the adaptor sleeve, and wherein the first and second compressor spacer members are compressingly secured between the lock nut and the main frame.

7. The improved compression link assembly of claim 3 further comprising:

washer means for separating the backup nut and the compression spacer member in an assembled position.

8. The improved compression link assembly of claim 3 further comprising:
washer means for separating the lock nut and the main frame in an assembled position.

9. In an automobile front suspension system, an improved compression link rod adaptor assembly for adjustably connecting the compression link rod to the main frame of the automobile to effect adjustable caster setting of the supported wheel assembly, comprising:
an adaptor sleeve for connecting the existing compression link rod to the main frame, said existing compression link rod having a first end attachable to the wheel assembly and an externally threaded second end, a shoulder stop formed between the first and second ends, the adaptor sleeve having a longitudinal bore and an internally disposed shoulder stop engaging portion, the second end of the existing compression link rod extendable through the longitudinal bore such that the shoulder stop thereof abuttingly engages the shoulder stop engaging portion of the adaptor sleeve;
a compression spacer member supportable on the adaptor sleeve; and
lock means for securing the compression link rod to the main frame such that the compression spacer member and main frame are grippingly engaged between portions of the lock means.

10. The improved compression link rod adaptor assembly of claim 9 wherein the adaptor sleeve has an externally threaded first end portion, and wherein the lock means comprises:
a backup nut threadingly supportable on the first end portion of the adaptor sleeve.

11. The improved compression link rod adaptor assembly of claim 10 wherein the adaptor sleeve has an externally threaded second end portion, and wherein the lock means further comprises:
a lock nut threadingly supported by the second end portion of the adaptor sleeve rod such that the compression link rod is secured to the main frame as the lock nut and backup nut are secured to transfer compressive stress between the main frame and the shoulder stop of the existing compression link rod.

12. The improved compression link rod adaptor assembly of claim 11 wherein a second compression spacer member is supportable on the adaptor sleeve between the lock nut and the backup nut.

13. The improved compression link rod adaptor assembly of claim 12 further comprising:
washer means for separating the lock nut and the backup nut from the compression spacer members in an assembled position.

* * * * *